US009783400B2

(12) United States Patent
Wieler

(10) Patent No.: US 9,783,400 B2
(45) Date of Patent: Oct. 10, 2017

(54) INDUSTRIAL TRUCK

(71) Applicant: KION Warehouse Systems GmbH, Reutlingen-Mittelstadt (DE)

(72) Inventor: Daniel Wieler, Reutlingen (DE)

(73) Assignee: Kion Warehouse Systems GmbH, Reutlingen (DE)

( * ) Notice: Subject to any disclaimer, the term of this patent is extended or adjusted under 35 U.S.C. 154(b) by 0 days.

(21) Appl. No.: 14/629,516

(22) Filed: Feb. 24, 2015

(65) Prior Publication Data
US 2015/0239720 A1    Aug. 27, 2015

(30) Foreign Application Priority Data

Feb. 25, 2014   (DE) .................. 10 2014 102 444
Jul. 15, 2014   (DE) .................. 10 2014 109 892

(51) Int. Cl.
*B66F 9/18*    (2006.01)
*B66C 3/00*    (2006.01)

(52) U.S. Cl.
CPC ............ *B66F 9/18* (2013.01); *B62B 2203/29* (2013.01)

(58) Field of Classification Search
CPC ........ B62B 2203/29; B66F 9/18; B66F 9/183; B66F 9/185
USPC ........................................................ 414/785
See application file for complete search history.

(56) References Cited

U.S. PATENT DOCUMENTS

| | | | | | |
|---|---|---|---|---|---|
| 1,563,650 A | * | 12/1925 | Pleines | ...................... | B66F 9/06 187/233 |
| 2,256,454 A | * | 9/1941 | Bomar | ...................... | B66F 9/19 108/51.11 |
| 2,875,913 A | * | 3/1959 | Gohrke | ...................... | B66F 9/18 269/107 |
| 3,013,517 A | * | 12/1961 | Isham | ...................... | B63B 21/54 114/221 R |
| 3,338,616 A | * | 8/1967 | Ericson | ................... | B66F 9/187 294/110.1 |
| 3,425,732 A | * | 2/1969 | Reich | ...................... | A22B 7/001 294/115 |
| 3,593,672 A | * | 7/1971 | Breen | ....................... | B66F 9/18 105/371 |

(Continued)

FOREIGN PATENT DOCUMENTS

| | | | |
|---|---|---|---|
| EP | 1627847 A1 | 2/2006 | |
| NL | WO 2010080023 A1 * | 7/2010 | ............... B66C 1/10 |

*Primary Examiner* — Charles A Fox
*Assistant Examiner* — Joseph J Sadlon
(74) *Attorney, Agent, or Firm* — The Webb Law Firm

(57) ABSTRACT

An industrial truck (1) has a load fork (7) comprising two fork tines (7a, 7b). A load carrier interlocking device (15) is formed by two pivotable cheeks (16a, 16b), each of which is provided with a toothed segment (17a, 17b) on end surfaces facing each other. The toothed segments (17a, 17b) secure the load carrier (L1, L2, L3) positively. The cheeks (16a, 16b) are biased by a spring device (30) toward a pick up position and an interlocking position. When the industrial truck (1) enters a load carrier (L1, L2, L3) with the load fork (7), the cheeks (16a, 16b) are pivoted outwardly away from each other by the load carrier (L1, L2, L3) against the force of the spring device (30). When the load carrier (L1, L2, L3) is completely picked up, the cheeks (16a, 16b) are actuated by the spring device (30) toward the interlocking position, in which the load carrier (L1, L2, L3) is secured positively in position by the toothed segments (17a, 17b).

18 Claims, 17 Drawing Sheets

(56) References Cited

U.S. PATENT DOCUMENTS

| | | | | | |
|---|---|---|---|---|---|
| 3,765,061 | A | * | 10/1973 | Nash | A43C 3/04 |
| | | | | | 114/210 |
| 3,982,645 | A | * | 9/1976 | Brink | B66F 9/186 |
| | | | | | 414/607 |
| 4,334,817 | A | * | 6/1982 | Vansickle | A01D 87/127 |
| | | | | | 294/206 |
| 4,620,499 | A | * | 11/1986 | Slemmons | B63B 21/08 |
| | | | | | 114/218 |
| 4,726,729 | A | * | 2/1988 | Olson | B62D 1/28 |
| | | | | | 294/907 |
| 4,956,897 | A | * | 9/1990 | Speedie | A43C 3/04 |
| | | | | | 24/134 P |
| 5,692,872 | A | * | 12/1997 | Raben | B66F 9/18 |
| | | | | | 414/607 |
| 5,960,689 | A | * | 10/1999 | Warren | B23B 13/123 |
| | | | | | 414/14 |
| 6,857,381 | B2 | * | 2/2005 | Siewert | F16G 11/106 |
| | | | | | 114/218 |
| 7,448,842 | B2 | | 11/2008 | Schonauer | |
| 7,544,037 | B2 | * | 6/2009 | Haverfield | B62B 3/06 |
| | | | | | 294/110.1 |
| 8,794,386 | B2 | * | 8/2014 | Keeling | B66F 9/063 |
| | | | | | 187/222 |
| 9,403,547 | B2 | * | 8/2016 | Ellington | B62B 3/06 |
| 2008/0107511 | A1 | * | 5/2008 | Oberg | B62B 1/06 |
| | | | | | 414/445 |

* cited by examiner

INDUSTRIAL TRUCK

CROSS REFERENCE TO RELATED APPLICATIONS

This application claims priority to German Application No. 102014102444.3 filed Feb. 25, 2014 and German Application No. 102014109892.7 filed Jul. 15, 2014, which are herein incorporated by reference in their entirety.

BACKGROUND OF THE INVENTION

Field of the Invention

This invention relates to an industrial truck with a load handling device for the handling of a load carrier. The load handling device is formed by a load fork that includes two fork tines. The load handling device has a load carrier interlocking device for interlocking the load carrier being handled with the load fork.

Description of Related Art

Industrial trucks, such as order picker trucks in the form of vertical pickers, have a driver's cab with an operator's lift cage that can be raised and lowered. Located on the driver's cab is a load handling device which is formed by a load fork oriented in the longitudinal direction of the truck. The load fork is formed by fork tines. Order picker trucks, such as vertical pickers, are used in picking operations, rack systems, and for picking goods from higher-level shelves.

The load fork can be used to pick up a load carrier, such as a pallet, on which merchandise is loaded or unloaded during picking operations.

The purpose of the load carrier interlocking device is to secure the load carrier that has been picked up with the load fork to prevent it from shifting, tipping, or falling. It is particularly necessary to hold the load carrier on the load fork when, during picking operations, the operator of the industrial truck climbs onto the load carrier located on the load fork when the load fork is raised, and thus the load carrier located on the load fork is accessible to the operator.

EP 1 627 847 B1 describes a generic industrial truck equipped with a load carrier interlocking device. The load carrier interlocking device consists of two clamping levers that are biased toward a clamped position by a tension spring. By means of a drive system formed by a spindle drive with an extendable spindle or a piston-cylinder system, the two clamping levers can be actuated into a release position. To pick up a load carrier, the clamp levers are actuated by the drive device into the release position, so that the clamp levers are opened wide enough and a foot part of the load carrier can be inserted between the opened clamping levers. To secure the load carrier that is being picked up if the load carrier is picked up completely, the clamp levers are actuated by the drive system into the clamping position, in which the clamping levers are in contact against the foot part of the load carrier and the tension spring exerts a corresponding clamping force on the foot part of the load carrier. On account of the need for a drive system, a load carrier interlocking device of this type is complex and expensive to build. It is also more complicated to operate because, before picking up a load carrier, first the clamping levers must be actively actuated by the drive system into the open position and, after the load carrier has been picked up, the clamping levers must then be actively actuated by the drive system into the clamping position. This system also poses a risk of incorrect operation or operator error. If the clamping levers are not actuated into the clamped position when the load carrier is picked up all the way, the picked up load carrier is not secured, and the load carrier that has been picked up is not secured in the event of a failure of the energy supply from the drive system of the load carrier interlocking device.

An object of this invention is to provide an industrial truck of the general type described above, but in which the load carrier interlocking device is simple and economical to construct, offers safe, simple, and reliable operation, and with which a load carrier that has been picked up can be held securely.

SUMMARY OF THE INVENTION

The invention teaches that this object can be accomplished by a load carrier interlocking device formed by two pivoting cheeks, each of which is mounted so that it can pivot around a pivoting axis. The cheeks are each provided on their facing end surfaces with a toothed segment. The toothed segments, in an interlocked position of the cheeks, positively secure the load carrier. The cheeks are biased by a spring device toward a pick up position and an interlocking position. The two cheeks are pivoted inwardly toward each other in the pick up position and the interlocking position. The cheeks are constructed so that as the industrial truck with the load fork is driven into the load carrier during the pick up of the load carrier, the checks, in the pick up position, are pivoted outwardly away from each other by the load carrier being picked up against the force of the spring device. When the load carrier has been picked up completely, the cheeks are actuated by the spring device toward the interlocking position in which the load carrier is positively secured by the toothed segments.

The load carrier interlocking device of the invention forms a holding system for the load carrier picked up with the load fork, in which the two cheeks are actuated independently and passively when the load carrier is picked up, so that no active actuation of the two cheeks into a pick up position is necessary before the load carrier is picked up. The cheeks are biased toward the pick up position and the interlocking position by a spring device. In both positions, the two cheeks are pivoted inwardly toward each other. When the industrial truck with the load fork is driven into the load carrier during the pick up of the load carrier, starting from the pick up position, the two cheeks are pivoted outwardly against the force of the spring device by the load carrier being picked up. After the industrial truck has been driven all the way into the load carrier, the cheeks are once again actuated by the spring device toward the interlocking position. Therefore, no active actuation of the two cheeks into the interlocking position is necessary at the end of the pick up process of the load carrier. Instead, the cheeks automatically and independently pivot into the interlocking position when the load carrier has been picked up all the way and therefore secure the load carrier automatically and independently. Consequently, no drive system is necessary for an active actuation of the cheeks on the load carrier interlocking device, which is controlled completely passively during the pick up of the load carrier, as a result of which the load carrier interlocking device of the invention is simple and economical to build. As a result of the passive functioning of the cheeks when a load carrier is picked up, there is also a secure, simple, and reliable operation of the load carrier interlocking device, which presents no risk of incorrect operation or operator error and also continues to operate even without an external power supply, so that a load carrier, once it has been picked up, can be held securely.

Furthermore, the load carrier that has been picked up is held positively in the interlocking position of the cheeks. Compared to a load carrier interlocking device of the prior art, in which the load carrier is held frictionally or non-positively by a clamping force, the positive securing of the load carrier can prevent damage to the load carrier.

In one advantageous embodiment of the invention, the two cheeks interact with a center web of the load carrier. In the interlocking position, the two cheeks with the toothed segments are engaged positively in the center web of the load carrier. On a load carrier with a center web, such as a continuous center web, a positive connection can easily be formed by an engagement of the toothed segments in the center web, to secure the load carrier. A load carrier with a continuous center web, such as one made of wood, being handled on the load fork therefore can be held positively, safely, and easily using the load carrier interlocking device of the invention.

It is particularly advantageous if, as in one development of the invention, a force-amplifying self locking of the cheeks occurs in the interlocked position. The cheeks are constructed so that a self locking is achieved on a load carrier with a center web. By means of the principle of self locking, in the interlocked position, the normal force of the teeth of the toothed sections on the cheeks infinitely reinforces the movement of the load carrier in the longitudinal direction of the industrial truck and thus in the direction of travel and the teeth of the toothed segments on the cheeks press into the center web of the load carrier and create the positive connection to secure the picked up load carrier. As a result of the self locking, there is an amplification of the force, as a result of which the teeth of the tooth segments press into the center web of the load carrier and hold the load carrier positively.

In an alternative and advantageous embodiment of the invention, the two cheeks interact with a center block of the load carrier. When the load carrier has been completely picked up, in the interlocked position, the two cheeks with the toothed segments are positively engaged from behind with the center block of the load carrier. On a load carrier with a center block, a positive connection to secure the load carrier easily can be achieved if, when the load carrier has been completely picked up, the cheeks pivot around the center block and hold the center block positively.

The teeth of the toothed segments are particularly advantageously each provided on at least one tooth flank with radial surfaces that have their center point in the pivoting axis of the associated cheek. During movement of the picked up load carrier in the longitudinal direction of the industrial truck, and thus in the direction of travel, the line of action of a contact force that occurs between the center block and the radial surface of the teeth runs through the pivoting axis of the cheek, so that the contact force does not exert any torque on the cheek, which would result in an undesirable pivoting of the cheek.

In one advantageous embodiment of the invention, the toothed segment is located on an arcuate curved contour segment of the cheeks. With cheeks designed in this manner, it becomes easily possible, by means of a corresponding shape of the arcuate curved contour segment, to secure both load carriers with a center web as well as load carriers with a center block to prevent unintentional movement.

In one advantageous embodiment of the invention, the toothed segment is located on a straight-line contour segment of the cheek. If load carriers with a center block are to be secured, it is sufficient if a straight-line contour segment of the cheek is provided with the toothed segment, as a result of which the manufacture of the cheeks is simplified.

In one advantageous development of the invention, for the pivoting of the cheeks into a release position in which the load carrier is released, an actuator device is provided. By actuation of the actuator device, the cheeks can be pivoted outwardly against the force of the spring device. The cheeks need only be activated into a release position to set down a load carrier, to pivot the cheeks outwardly and thus open the cheeks and to undo the positive connection between the cheeks and the center block or the center web of the load carrier and make it possible to withdraw the industrial truck from the load carrier. An actuator device of this type can be easily implemented purely mechanically.

In one advantageous embodiment of the invention, the actuator device has a manually actuatable control element, such as a foot pedal, that is in an operative connection with the cheeks by actuator means, such as an actuator rod or a pull cable. The cheeks can be actuated by an operator into the release position easily and with the application of only a small amount of force simply by actuating the control element to be able to drive the truck out of the load carrier. The force necessary for the pivoting of the cheeks outwardly can be transmitted with little added construction effort or expense and with a simple construction by actuator rods, such as toggle links or a pull cable, from the control element to the two cheeks. Because the control element needs to be activated only when the truck is being driven out of the load carrier, operation is simple and ergonomic. As soon as the industrial truck has driven out of the load carrier, the actuation of the control element can be ended, so that the cheeks are automatically pivoted by the spring device into the pick up position, in which another load carrier can be picked up.

In one advantageous embodiment of the invention, the cheeks are each installed so that they can pivot around a vertical pivoting axis on the industrial truck. The pivoting axes are located at a distance from each other in the transverse direction of the vehicle. This makes it possible in a simple manner, when the industrial truck is being driven into a load carrier, to achieve contact between the center web or the center block of the load carrier and both cheeks, and as the industrial truck drives further into the load carrier, the cheeks can be pivoted outwardly by the center web or the center block.

In one advantageous embodiment of the invention, the pivoting axes of the cheeks are each oriented in the longitudinal direction of the load handling device between a contact surface of the load handling device, in particular the back of the fork carrier, against which the fully picked up load carrier is in contact, and a fork tip of the fork tines. After the center web or the center block of the load carrier is in contact with both cheeks, as the industrial truck continues to drive into the load carrier, the cheeks are automatically pivoted outward against the force of the spring device.

With regard to the simple construction and simple outfitting of the industrial truck with a load carrier interlocking device, it is particularly advantageous if the cheeks are each mounted on a retaining component so that they can rotate around a pivoting axis. The retaining components are located adjacent to the inside of the fork tines and extend from the back of the fork carrier toward the tips of the fork tines. The cheeks can be mounted on such retaining components with little added construction or effort so that they can pivot around a pivoting axis. Retaining components of this type can be easily mounted on the inner sides of the fork tines or on the back of the fork carrier.

It is particularly advantageous if the load carrier interlocking device is provided with an entry pocket for the center web or the center block of the load carrier. The entry pocket is formed on each cheek by a guide surface oriented parallel to the fork tine and an insertion bevel that runs at an angle to the guide surface. With an entry pocket of this type, the industrial truck can easily be driven into a load carrier by the insertion bevels. In addition, the guide surfaces of the entry pocket, which are oriented parallel to the fork tines, make it possible to minimize the potential movement of the picked up load carrier transverse to the longitudinal axis of the vehicle and transverse to the direction of travel.

In one advantageous development of the invention, the guide surface associated with one cheek and the insertion bevel relative to the pivoting axis of the associated cheek are adjustable. It thereby becomes possible with different load carriers, which differ from one another in terms of the width of the center web or the center block, to easily adapt and adjust the entry pocket to the individual type of load carrier being used.

The guide surface and insertion bevel associated with the cheek are each located on a guide component fastened to the retaining component on which the cheek is mounted.

If the guide components are each fastened to the corresponding retaining component in different mounting positions, wherein in the different mounting positions the guide components are at a different distance from the guide surfaces that face each other, the entry pocket can easily be made adjustable to be able to adjust and to adapt the entry pocket to the type of load carrier being used.

In one preferred embodiment of the invention, the cheeks are each formed by at least two individual cheeks that are at a distance from each other in the vertical direction and are coupled with each other.

It is particularly advantageous if the spring device is formed by leg springs that are each associated each with one cheek. By using leg springs, which require very little space for the spring device, it is possible to actuate the corresponding cheeks into the pick up position and into the interlocking position.

A simple construction with a space-saving arrangement of the leg springs can be achieved if the respective leg springs are concentric to the pivoting axis of the associated cheek, and are supported with a first leg on the cheek and with a second leg on the retaining component on which the cheek is mounted.

The load handling device is advantageously provided with a sensor device to detect the presence of a fully picked up load carrier on the load fork.

The invention further relates to a system comprising an industrial truck of the invention and a load carrier, by which the load carrier is provided with a center web or a center block.

The load carrier of the system of the invention can be a pallet or a wire mesh box or a container or an order picker trolley. With the load carrier interlocking device of the invention, different load carriers, in particular different types of pallets, can be held in place safely and easily. The load carrier interlocking device of the invention is suitable for use with the widest possible variety of load carriers that are provided with a center web or a center block. Damage to the load carrier in the vicinity of the center block can be prevented when the load carrier has a center block, which in the interlocked position is positively gripped from behind by the two cheeks of the load carrier interlocking device.

BRIEF DESCRIPTION OF THE DRAWINGS

Additional advantages and details of the invention are explained in greater detail below with reference to the exemplary embodiments illustrated in the accompanying schematic figures, in which like reference numbers identify like parts throughout.

DESCRIPTION OF THE PREFERRED EMBODIMENTS

Figure 1:
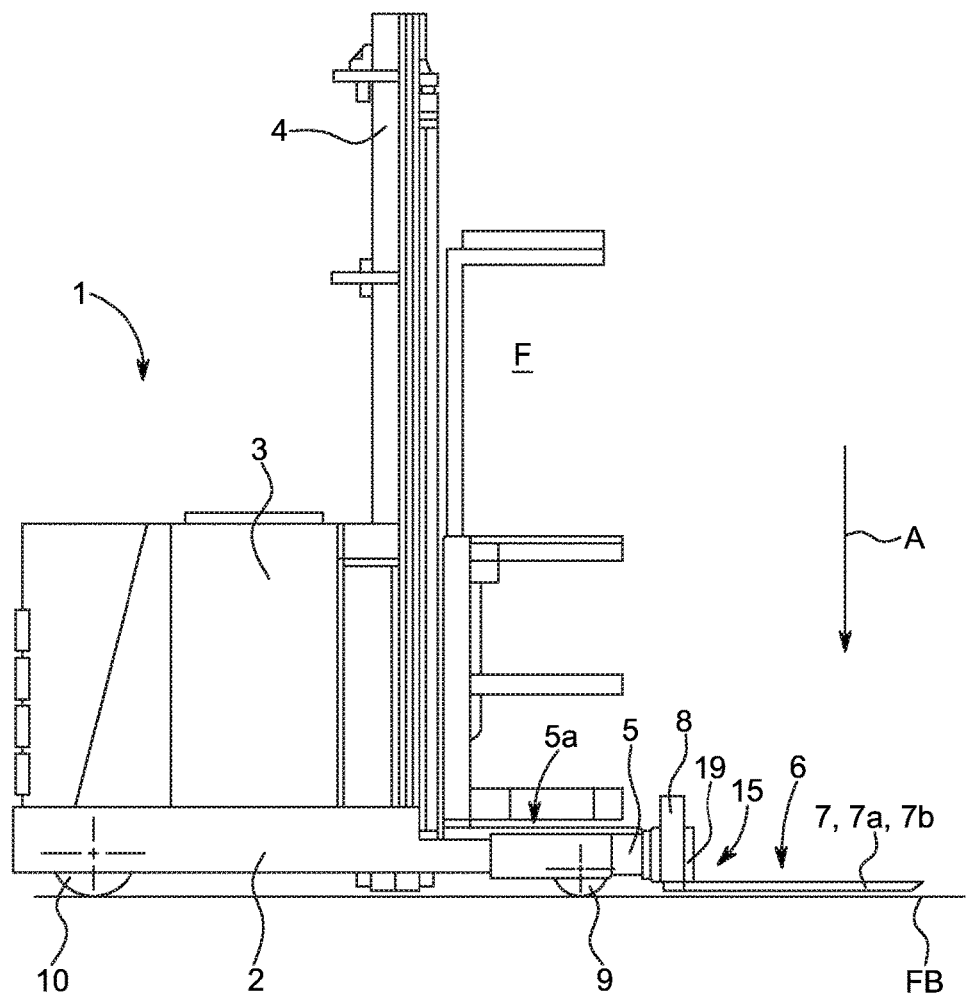
FIG. 1 shows an industrial truck of the invention in a side view.

FIG. 1 is a side view of an order picker industrial truck of the invention in the form of a vertical order picker.

The industrial truck 1 is illustrated as a vertical order picker having a vehicle body with a frame 2 in which there is a battery compartment to hold an energy supply unit 3, such as a drive battery, for a battery-powered electrical drive system of the industrial truck. The order picker industrial truck 1 has a main hoist 4 formed by a lifting frame, on which an operator's station 5 in the form of a lift cage that forms the operator's workspace F is located so that it can be raised and lowered by a hoist drive (not illustrated in detail). The vertically adjustable operator's station 5 is provided with a platform 5a on which the person operating the industrial truck 1 can stand.

In the illustrated order picker industrial truck 1, a load handling device 6 is located on and is fastened to the operator's station 5. In the illustrated exemplary embodiment, the load handling device 6 is a load fork 7, which has two fork tines 7a, 7b that are oriented in the longitudinal direction of the vehicle and are at distance from each other. The fork tines 7a, 7b are connected to the back 8 of the fork carrier of the load handling device 6, by means of which the load fork 7 is fastened to the operator's station 5.

The industrial truck 1 is supported on a floor or road FB by non-steerable and non-driven load wheels 9 located on a load-section-side end of the frame 2 and a steerable drive wheel 10 located on a drive-section-side end of the frame 2. In the drive-section-side end of the frame 2, there is also an electrical drive system (not illustrated in detail) that comprises an electric traction motor and a steering drive system, such as an electric steering motor, for the steerable drive wheel 10 and an electrically operated hydraulic pump unit, which is provided to supply the hydraulic work systems formed by the hoist drive of the main hoist 4 and optionally by additional drive systems.

On the industrial truck 1, the operator's station 5, which can be raised and lowered, is located over the load wheels 9.

The load fork 7 is used to handle a load carrier, such as a pallet or alternatively a wire mesh box, a container, or an order picker trolley. Load carriers of this type have a load surface, on the underside of which are located a plurality of beam-like or block-like foot parts to keep the loading surface at a defined vertical distance from a storage surface, such as the road surface FB or the floor of the shelf, and to allow the insertion of the fork tines 7a, 7b. The foot parts generally have corner-side foot parts located on the outside corners of the load carrier and central foot parts located in the center area of the outer edges, which, depending on the design of the load carrier, can be beam-like and continuous center webs or rectangular center blocks. Between the corner-side foot parts and the center foot parts of the load carrier there are insertion channels for the fork tines 7a, 7b, which make it possible to insert the fork tines 7a, 7b into the load carrier. Load carriers in the form of pallets are regionally standardized and are known for example as "Euro pallets", "US pallets", "Australian pallets" or "CHEP pallets". Depending on the design of the load carrier, the load carrier can be held longitudinally and/or transversely with the fork tines 7a, 7b.

The industrial truck 1 is provided with a load carrier interlocking device 15 for the interlocking of a load carrier picked up with the load fork 7. The load carrier interlocking device 15 is illustrated in greater detail in FIGS. 2 to 12.

The load carrier interlocking device 15 (viewed in the transverse direction of the industrial truck 1) is located between the two fork tines 7a, 7b, and interacts positively with a foot part of a load carrier in the form of a center web or a center block to secure the load carrier picked up with the fork tines 7a, 7b against slipping, tipping, and falling, as described in more detail below.

The load carrier interlocking device 15 has two pivotable cheeks 16a, 16b, each of which is mounted so that it can pivot around a vertical pivoting axis Sa, Sb, respectively. The cheek 16a can pivot around the pivoting axis Sa and the cheek 16b around the pivoting axis Sb. The two pivoting axes Sa, Sb, are located at a distance from each other in the transverse direction of the vehicle.

The cheek 16a is provided on an end surface facing the cheek 16b with a toothed segment 17a. The cheek 16b is correspondingly provided on an end surface facing the cheek 16a with a toothed segment 17b.

The cheeks 16a, 16b are each mounted rotationally on respective retaining components 18a, 18b so that they can rotate around the respective pivoting axis Sa, Sb. The retaining component 18a on which the cheek 16a is pivotably mounted is located adjacent to the vertical inner side 7c of the fork tine 7a and extends from the back 8 of the fork carrier toward the tip 7e of the fork tine 7a. The retaining component 18b on which the cheek 16b is pivotably mounted is located adjacent to the vertical inner side 7d of the fork tine 7b and extends from the back 8 of the fork carrier toward the tip 7f of the fork tine 7b. To fasten the retaining components 18a, 18b to the back 8 of the fork carrier, there is a fastening plate 19 on which the retaining components 18a, 18b are located and which is fastened to the back 8 of the fork carrier, for example, by means of a threaded connection (not illustrated in detail).

The pivoting axes Sa, Sb of the cheeks 16a, 16b are each located in the longitudinal direction of the load handling device 6 between a stop surface 40 of the load handing device 6, with which the fully picked up load carrier is in contact, and the tips 7e, 7f of the fork tines 7a, 7b. In the illustrated exemplary embodiment, the stop surface 40 for the load carrier is located on the front side of the fastening plate 19 and on corresponding stop plates 41a, 41b of the fork carrier.

The load carrier interlocking device 15 is also provided with an entry pocket 20 for the center web or the center block of the load carrier. The entry pocket 20 is formed on each cheek 16a, 16b by a guide surface 21a, 21b located parallel to the fork tines 7a, 7b and an insertion bevel 22a, 22b that runs at an angle to the guide surface 21a, 21b.

The guide surfaces 21a, 21b and entry bevels 22a, 22b associated respectively with the cheeks 16a and 16b are each located on a guide component 23a, 23b. The guide component 23a is fastened to the retaining component 18a on which the cheek 16a is mounted. The guide component 23b is correspondingly fastened to the retaining component 18b on which the cheek 16b is mounted.

Figure 6A:
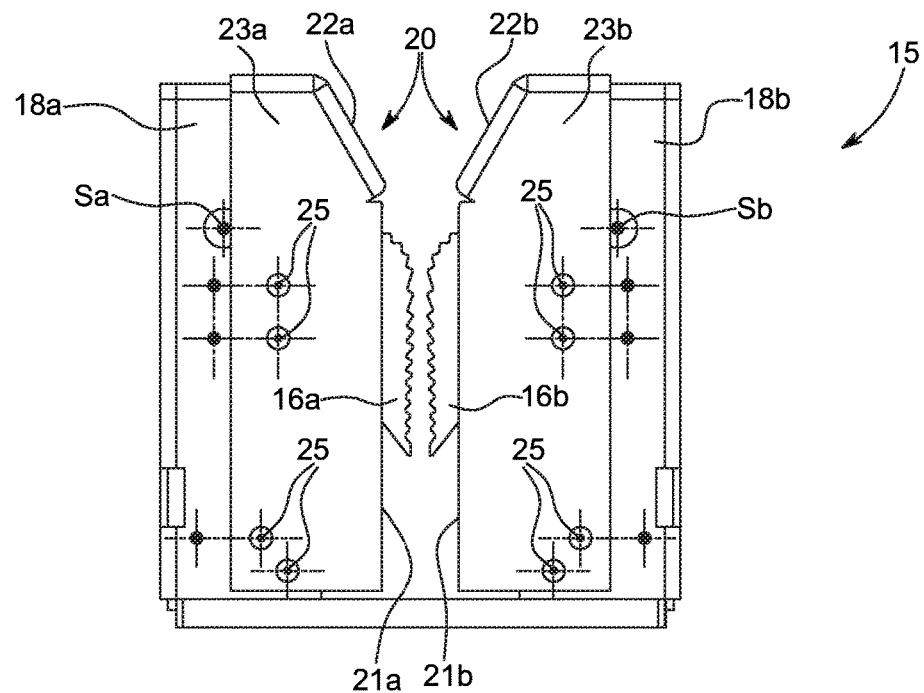
FIGS. 6a to 6c show the load carrier interlocking device in different attachment positions of an entry pocket.
Figure 6B:
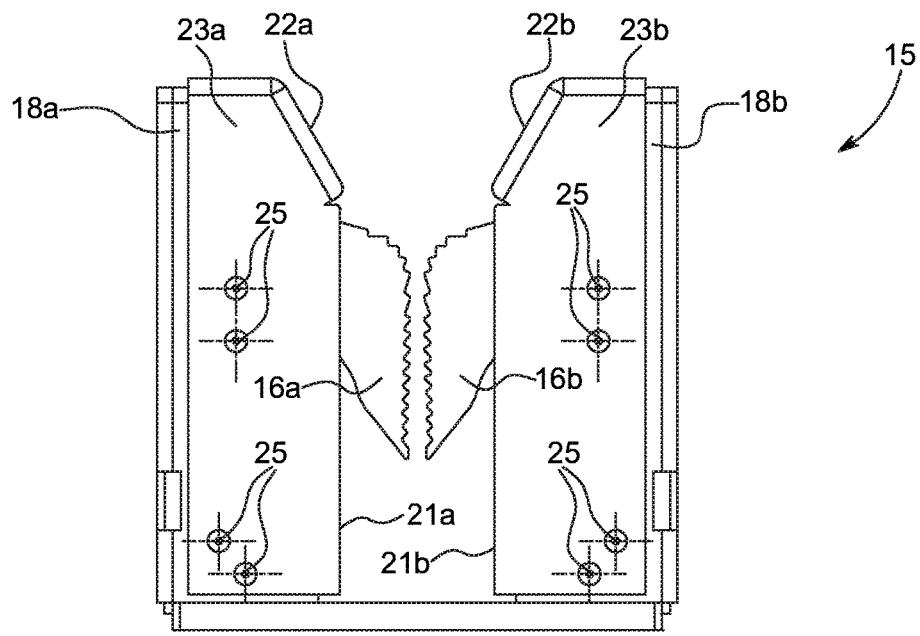
Figure 6C:
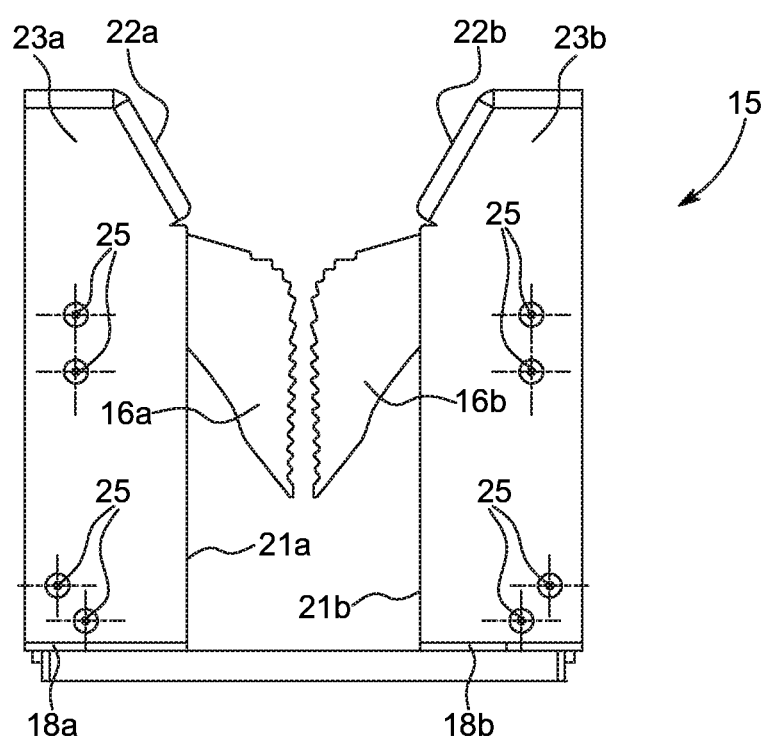

As illustrated in FIGS. 6a to 6c, the guide surfaces 21a or 21b and guide bevels 22a or 22b associated with the corresponding cheeks 16a or 16b, respectively, are adjustable in relation to the pivoting axis Sa, Sb of the associated cheek 16a, 16b in the transverse direction of the vehicle. For setting and adjustment of the guide surface 21a, 21b and of the entry bevel 22a, 22b relative to the associated cheek 16a, 16b, the guide components 23a, 23b can each be fastened to the corresponding retaining component 18a, 18b in different attachment positions. The guide components 23a, 23b in the different attachment positions lead to a different distance of the guide surfaces 21a, 21b facing each other. FIG. 6a illustrates a first attachment position of the guide components 23a, 23b on the retaining components 18a, 18b, with a narrow setting of the entry pocket 20. FIG. 6c illustrates a second attachment position of the guide components 23a, 23b on the retaining components 18a, 18b with a wide setting of the entry pocket 20. FIG. 6b illustrates a third attachment position of the guide components 23a, 23b on the retaining components 18a, 18b with a middle position of the entry pocket 20. In the illustrated exemplary embodiment, the guide components 23a, 23b are each fastened to the retaining components 18a, 18b by a plurality of fastening screws 25. A corresponding hole pattern is provided for the fastening screws 25 on the retaining component 18a, 18b, to make possible the different attachment positions of the guide components 23a, 23b. The adjustable entry pocket 20 makes possible, after the adaptation of the entry pocket 20 to the type of load carrier, the most centered entry into the load carrier possible.

As illustrated in FIGS. 3 to 11, the cheeks 16a, 16b are each formed by two individual cheeks that are separated from each other in the vertical direction and are non-rotationally coupled to each other.

In FIGS. 2, 3, 5a, 6a to 6c, 10a and 11, the cheeks 16a, 16b are shown in a pick up position in which a load carrier can be picked up. FIGS. 5b, 5c, 8, 9 and 10b show the cheeks 16a, 16b in an interlocked position in which a load carrier picked up with the fork tines 7a, 7b is secured positively by the toothed segments 17a, 17b of the cheeks 16a, 16b. In the pick up position and in the interlocked position, the cheeks 16a, 16b are pivoted inwardly toward each other. The cheeks 16a, 16b are biased toward the pick up position and the interlocked position and thus inwardly by a spring device 30.

Figure 2:
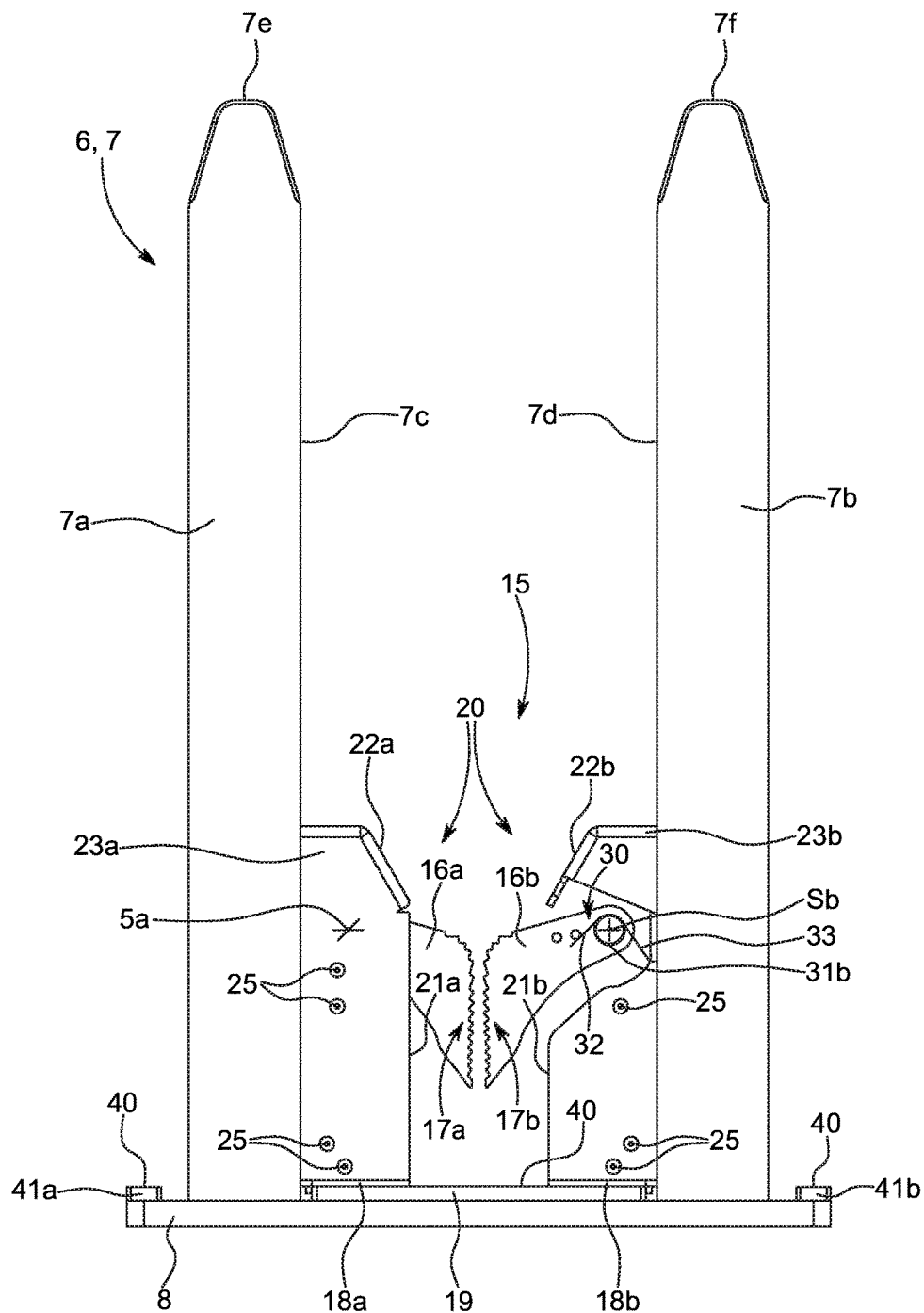
FIG. 2 a view along line A in FIG. 1 of the load handling device and a first embodiment of the load carrier interlocking device.

The spring device 30 is formed by two leg springs 31a, 31b, each of which is associated with a respective cheek 16a or 16b. The leg spring 31b associated with the cheek 16b is illustrated in greater detail in FIG. 2. As shown in FIG. 2, the leg spring 31b is concentric to the pivoting axis Sb of the cheek 16b and is supported with a first leg 32 on the cheek 16b and with a second leg 33 on the retaining component 18b on which the cheek 16b is mounted. The leg spring 31a associated with the cheek 16a is constructed and oriented analogously.

Figure 5A:
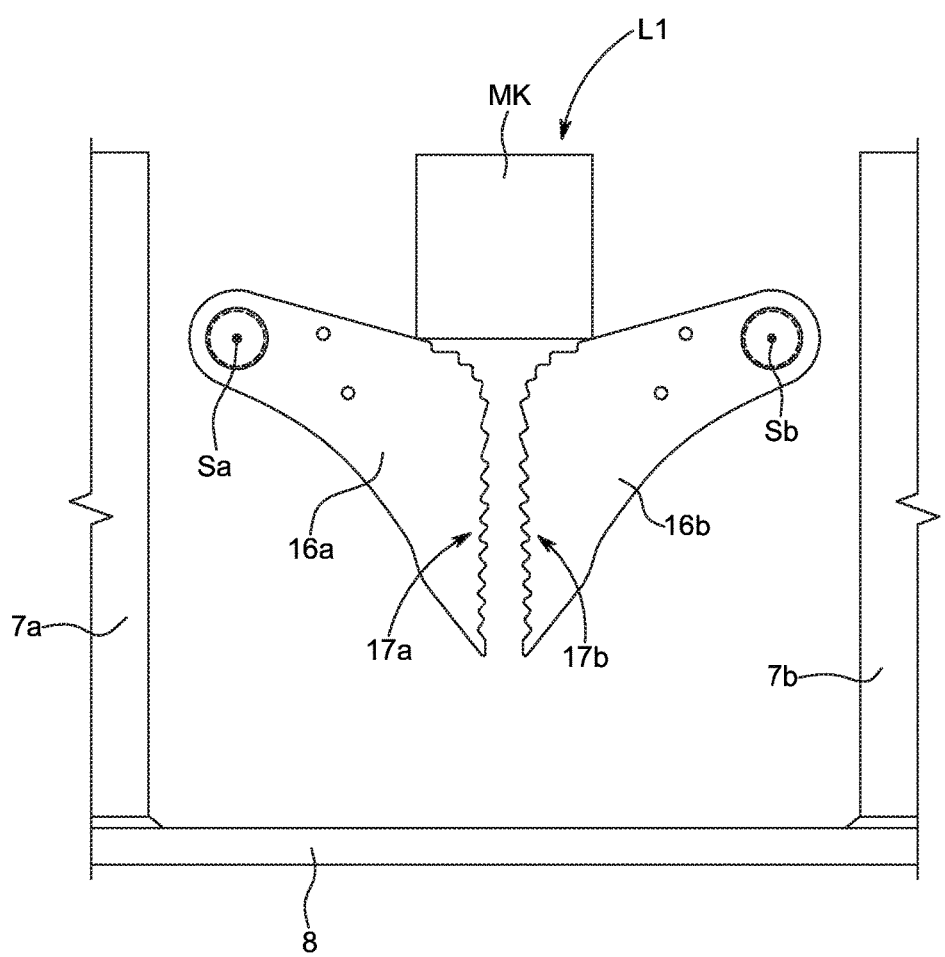
FIG. 5a shows the load carrier interlocking device illustrated in FIGS. 2 to 4 during insertion into a first embodiment of a load carrier, wherein the load carrier interlocking device is in a pick up position.
Figure 5B:
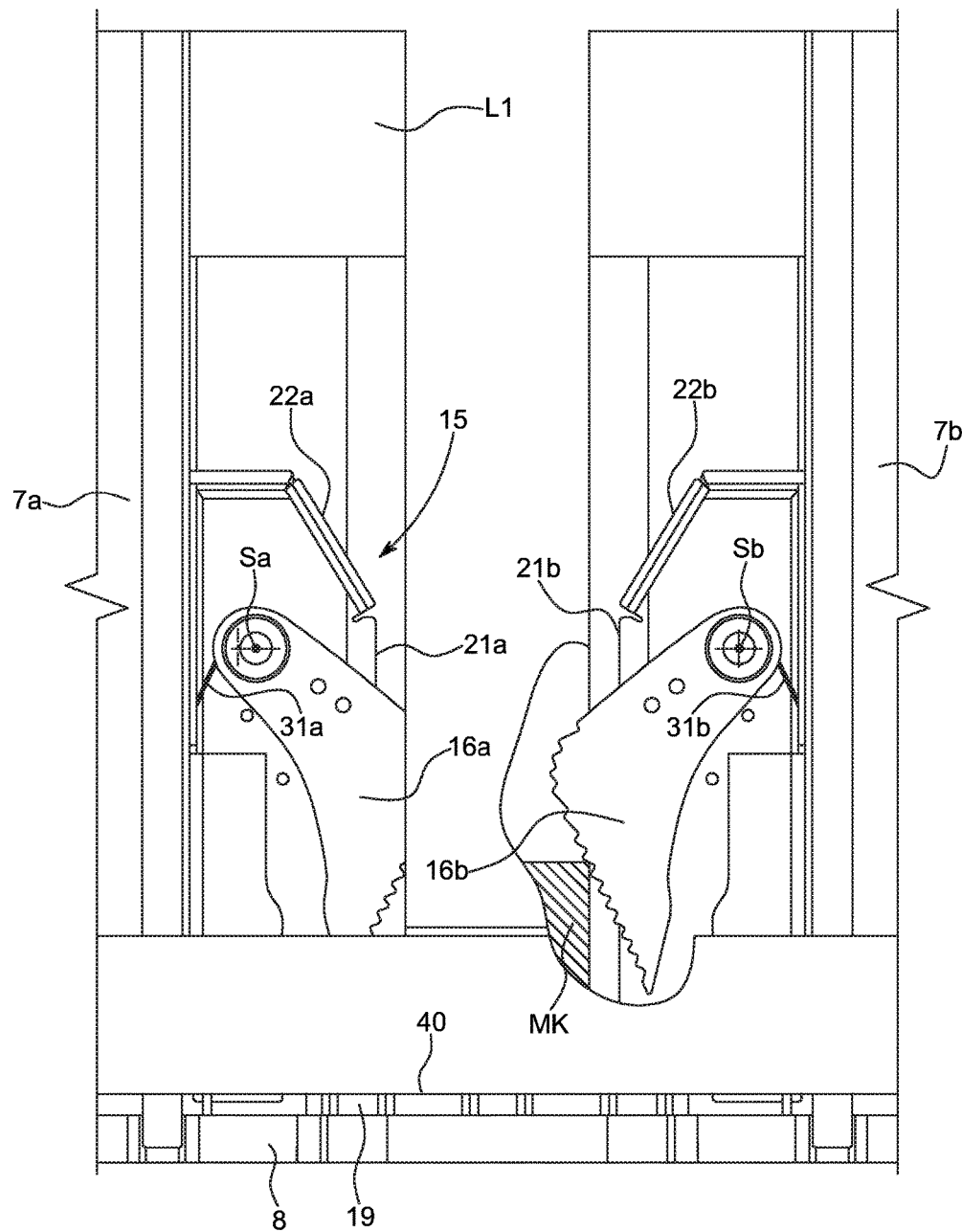
FIG. 5b shows the load carrier interlocking device illustrated in FIGS. 2 to 4 after the load carrier has been picked up, wherein the load carrier interlocking device is in an interlocked position.
Figure 5C:
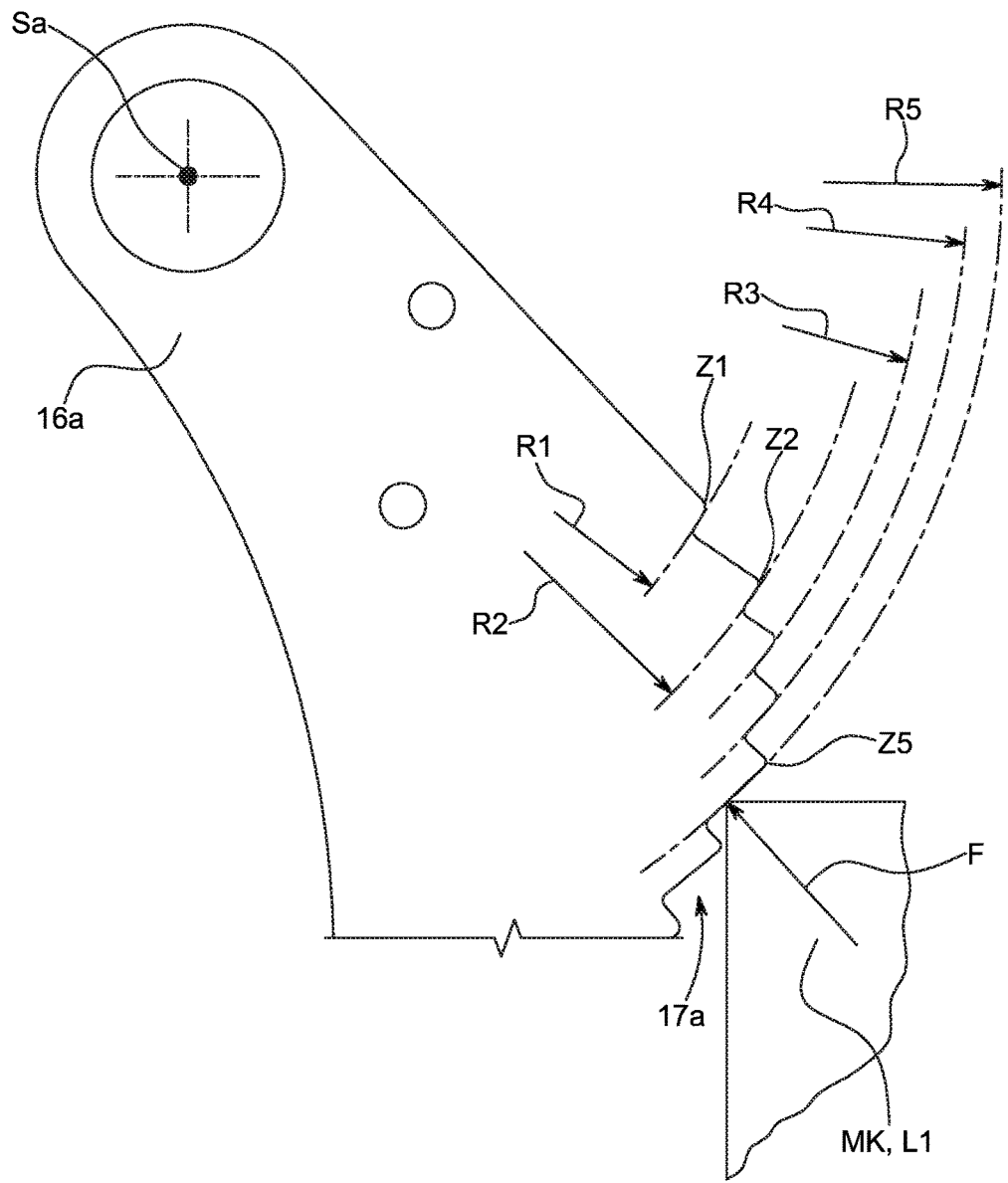
FIG. 5c is an enlarged detail of FIG. 5b.
Figure 5D:
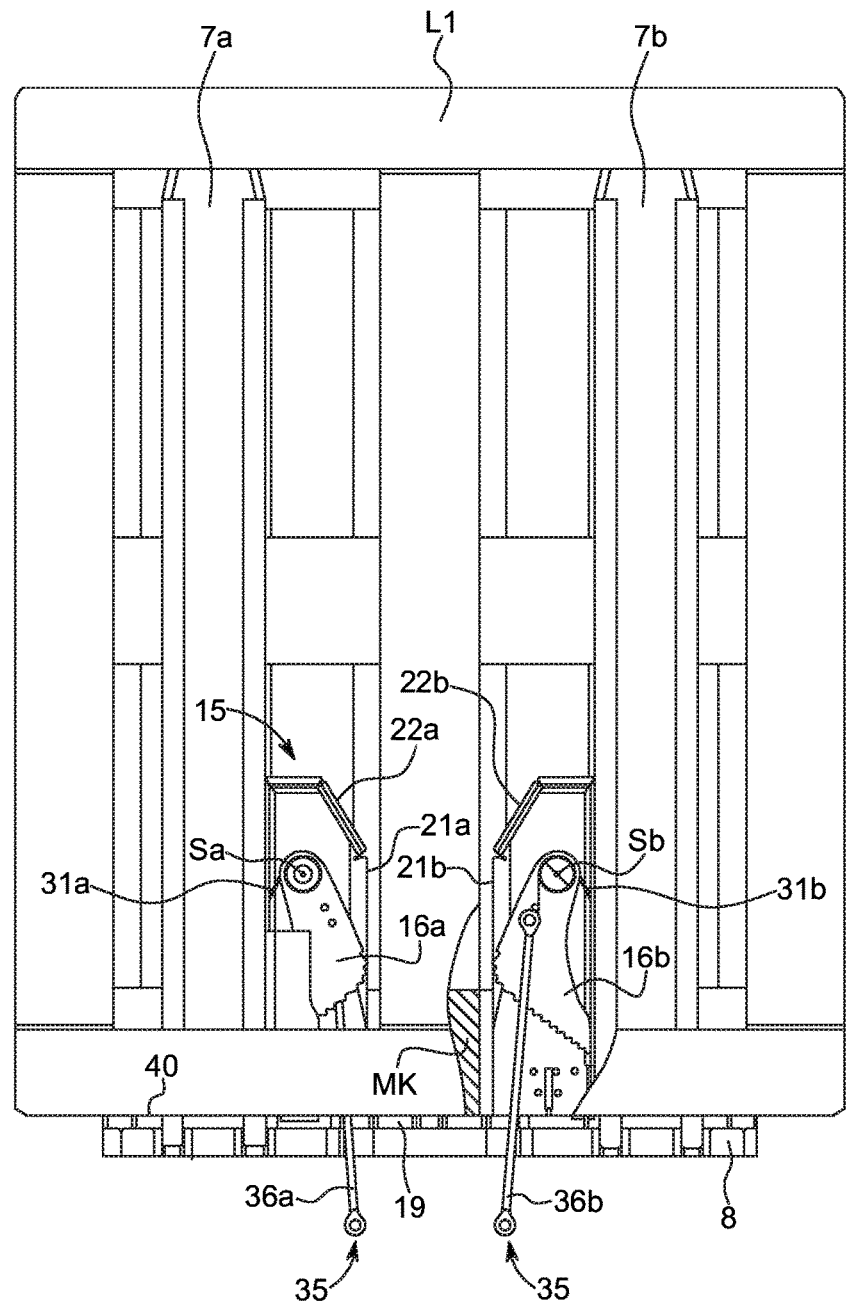
FIG. 5d shows the load carrier interlocking device illustrated in FIGS. 2 to 4, whereby the load carrier interlocking device is in a released position.

FIG. 5d shows the cheeks 16a, 16b in a release position in which the cheeks 16a, 16b are pivoted outwardly away from each other and release the load carrier.

An actuator device 35 is provided for pivoting and actuation of the cheeks 16a, 16b into the release position releasing the load carrier. The cheeks 16a, 16b can be pivoted outwardly against the force of the spring device 30 by actuation of the actuator device 35.

The actuator device 35 comprises a manually actuatable control element (not illustrated in detail), such as a foot pedal located on the operator's station 5. The control element is in an operative connection by respective actuation means 36a, 36b, such as an actuator rod or a pull cable, with the cheeks 16a, 16b. In the illustrated exemplary embodiment, the actuator rods 36a, 36b are in the form of toggle links, such as double toggle links, which are flexibly coupled to the cheeks 16a, 16b at a distance from the pivoting axes Sa, Sb.

Figure 3:
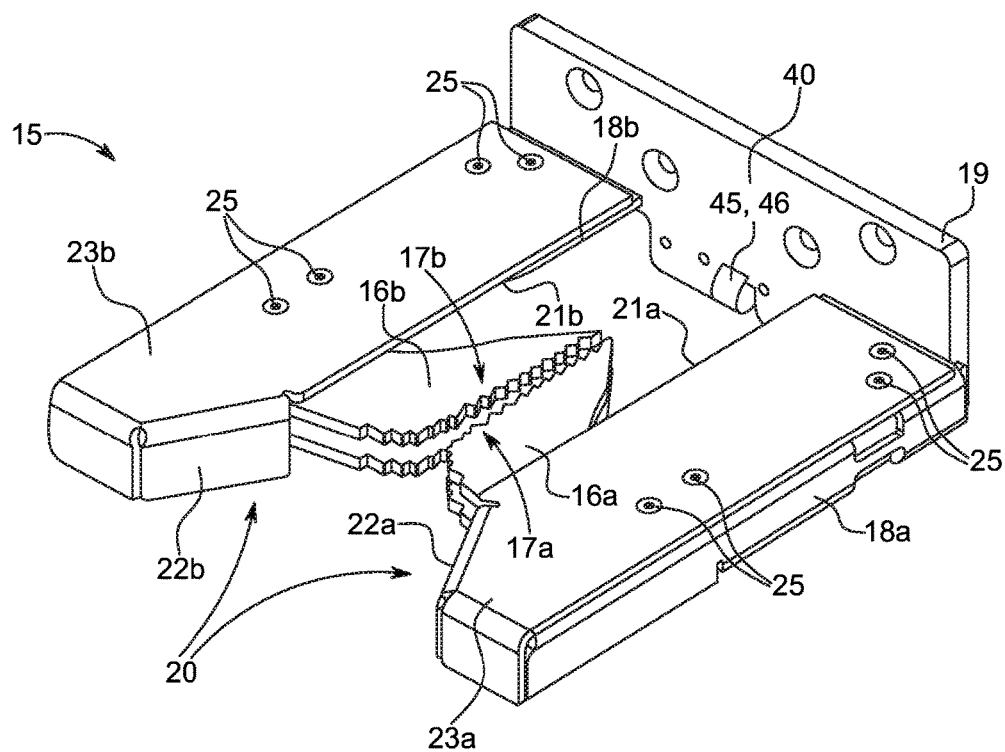
FIG. 3 is a view in perspective of the load carrier interlocking device illustrated in FIG. 2.

The load handling device 6 is also provided (as illustrated in FIG. 3), with a sensor device 45 to detect the presence of a fully picked-up load carrier on the load fork 7. The sensor device 45 has a mobile actuator plate 46 located movably on the fastening plate 19 and which can be actuated by the load carrier coming into contact with the stop surface 40. The position of the actuator plate 46 can be detected by a sensor (not illustrated in detail) to detect the presence of a load carrier in contact against the stop surface 40.

The cheeks 16a, 16b of the embodiment illustrated in FIGS. 1 to 10b (as illustrated in further detail in FIG. 4) have a contour with a straight-line contour segment K1 and an arcuate curved contour segment K2. In the pick up position of the cheeks 16a, 16b, the straight-line contour segment K1 is oriented substantially parallel to the longitudinal extension of the fork tines 7a, 7b and the arcuate curved contour segment K2 is formed by a rounded transition which is adjacent to the front side of the contour segment K1 and extends outward substantially perpendicular to the contour segment K1 toward the fork tines 7a or 7b. On the cheeks 16a, 16b illustrated in FIGS. 1 to 10a, the toothed segment 17a, 17b is located on the straight-line contour segment K1 and on the arcuate curved contour segment K2 of the cheeks 16a, 16b.

Figure 11:
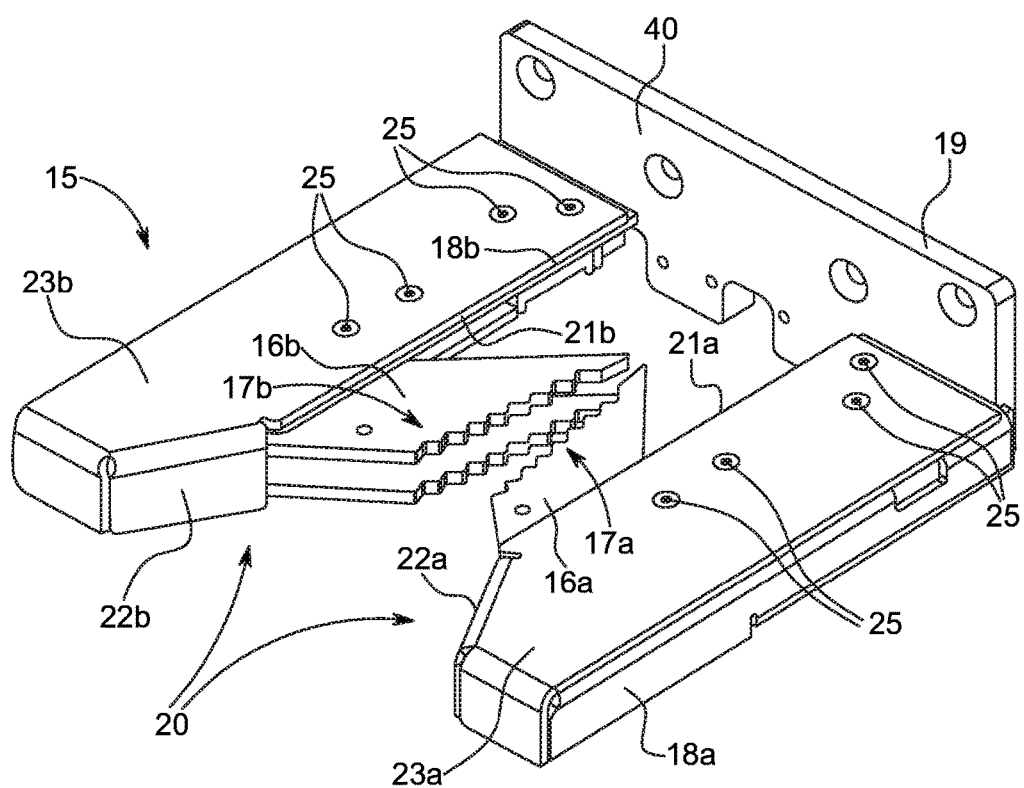
FIG. 11 is a view in perspective of a second exemplary embodiment of the load carrier interlocking device.
Figure 12:
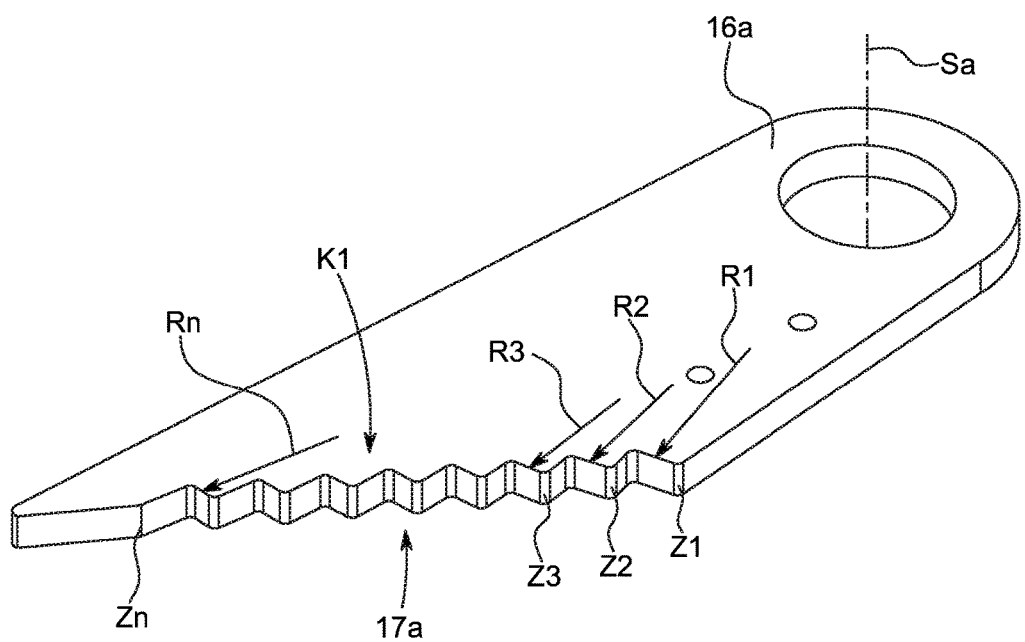
FIG. 12 shows a cheek of the load carrier interlocking device illustrated in FIG. 11.

The cheeks 16a, 16b of the embodiment illustrated in FIGS. 11 and 12 (as illustrated in further detail in FIG. 12) have a contour with a straight-line contour segment K1 on which the toothed segment 17a, 17b is located. In the pick up position of the cheeks 16a, 16b, the straight-line contour segment K1 is oriented substantially parallel to the longitudinal extension of the fork tines 7a, 7b.

In the pick up position of the cheeks 16a, 16b, the toothed segments 17a, 17b lie between a virtual straight line connecting the two pivoting axes Sa, Sb and the stop surface 40.

Figure 4:
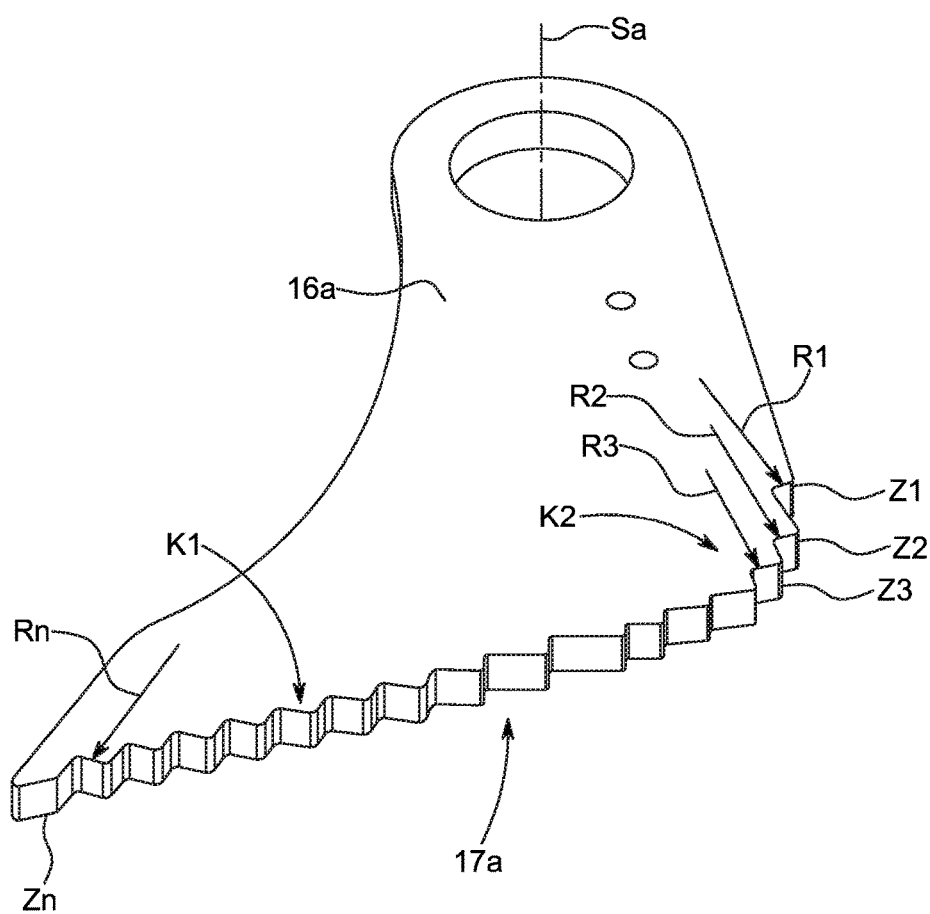
FIG. 4 shows a cheek of the load carrier interlocking device illustrated in FIGS. 2 and 3.

The toothed segments 17a, 17b of the cheeks 16a, 16b in FIGS. 1 to 12 have (as shown clearly in FIGS. 4, 5c and 12) toothing with a plurality of teeth Z1-Zn. On the teeth Z1-Zn of the toothed segments 17a, 17b, at least one tooth flank is in the form of a radial surface that has its midpoint in the pivoting axis Sa, Sb of the associated cheek 16a, 16b. In FIGS. 4, 5c and 12, the radial tooth flanks of the teeth Z1-Zn are illustrated with the radii R1-Rn on the teeth Z1-Zn.

The operation of the load carrier interlocking device 15 is described below.

In FIGS. 5a to 5d, the first embodiment of the load carrier interlocking device 15 is illustrated in connection with a load carrier L1 that comprises a center block MK with which the cheeks 16a, 16b interact in a form-fitting manner to secure the picked up load carrier L1. FIGS. 5a to 5d each show a view from below.

The load carrier L1 (as illustrated in greater detail in FIG. 5d) can be a Euro pallet.

To pick up the load carrier L1, the industrial truck 1 is driven toward the load carrier L1 and the fork tines 7a, 7b are inserted into the pick up channels of the load carrier L1. The cheeks 16a, 16b are in the pick up position, which represents a starting position of the cheeks 16a, 16b. As the fork tines 7a, 7b are inserted into the load carrier L1, the cheeks 16a, 16b in the pick up position come into contact with the front end surface of the center block MK, so that the center block MK is in contact with the cheeks 16a, 16b in the pick up position. This situation is illustrated clearly in FIG. 5a.

As the industrial truck 1 is driven farther into the load carrier L1, the cheeks 16a, 6b, which are in the pick up position, are pivoted outwardly away from each other by the load carrier L1 being picked up by the center block MK against the force of the spring device 30 and pivot outwardly, whereupon the cheeks 16a, 16b come into contact with the center block MK by means of the spring force of the spring device 30. As soon as the load carrier L1 has reached the stop surface 40 of the load handling device and is in contact with it, the cheeks 16a, 16b pivot by means of the spring force of the spring device 30 around the center block MK inwardly into an interlocking position in which the toothed segments 17a, 17b grip the center block MK from behind, to hold and secure the center block MK and thus the load carrier L1 positively. The contour segments K1, K2 of the cheeks 16a, 16b are designed so that the cheeks 16a, 16b, when the load carrier L1 is in contact against the stop surface 40, pivot around the center block MK and positively secure the center block MK. The securing position is illustrated in FIG. 5b.

The toothed segments 17a, 17b on the cheeks 16a, 16b prevent a movement of the load carrier L1 in the longitudinal direction of the load handling device 6.

In the event of a movement of the load carrier L1 in the transverse direction of the load handling device 6, the load carrier L1 is wedged in a pocket between the toothed segments 17a, 17b of the cheeks 16a, 16b and the stop surface 40 and is held in that position, so that the lateral movement of the load carrier is restricted.

As shown in FIG. 5c, which shows an enlarged illustration of the securing position, one outer corner of the rear end surface of the center block MK is in contact with the radial surface and the radial tooth flank of a corresponding tooth of the toothed segments of the cheeks 16a, 16b. Because the radial surfaces and the radial tooth flanks of the teeth Z1-Zn each have their center point in the pivoting axis Sa, Sb, in the event of a movement of the load carrier L1, the contact force F applied between the center block MK and the radial surface of the corresponding tooth runs through the pivoting axis Sa or Sb so that no torque is generated on the corresponding cheek 16a, 16b.

To withdraw the industrial truck and set the load carrier L1 down, the actuator device 35 is actuated by the operator so that the cheeks 16a, 16b, starting from the interlocking position, can be pivoted outwardly into a release position against the force of the spring device 30. The release position is illustrated in FIG. 5d. When the cheek 16a, 16b is in the release position, the fork tines 7a, 7b can be withdrawn from the load carrier L1. During the process of setting down of the load carrier L1, as soon as the center block MK is outside the cheeks 16a, 16b, the actuation of the actuator device 35 can be ended, so that the cheeks 16a, 16b are pivoted by the spring device 30 into the pick up position that forms the starting position.

The radial surfaces and the radial tooth flanks of the teeth Z1-Zn thereby make possible a secure opening of the cheeks 16a, 16b with low actuation forces.

Figure 7:
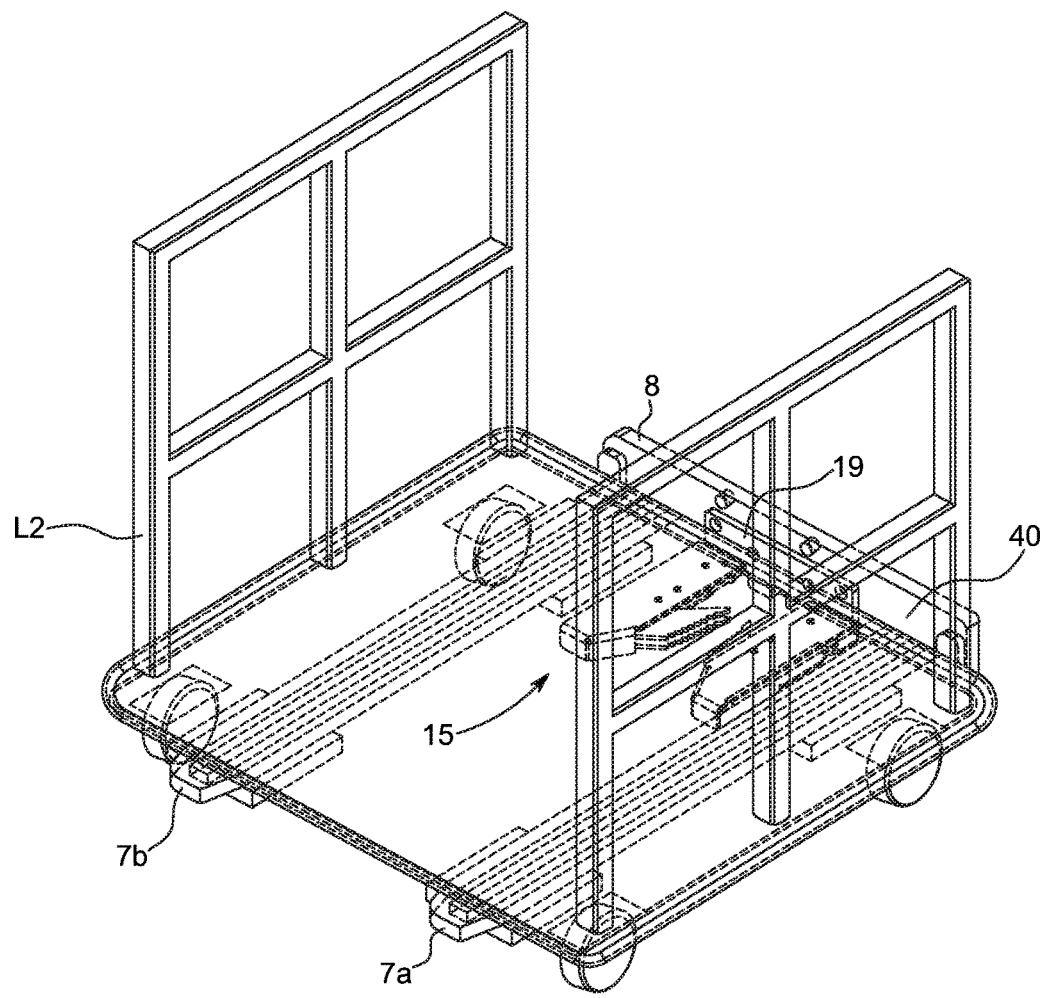
FIG. 7 shows the load carrier interlocking device with a second embodiment of a load carrier.
Figure 8:
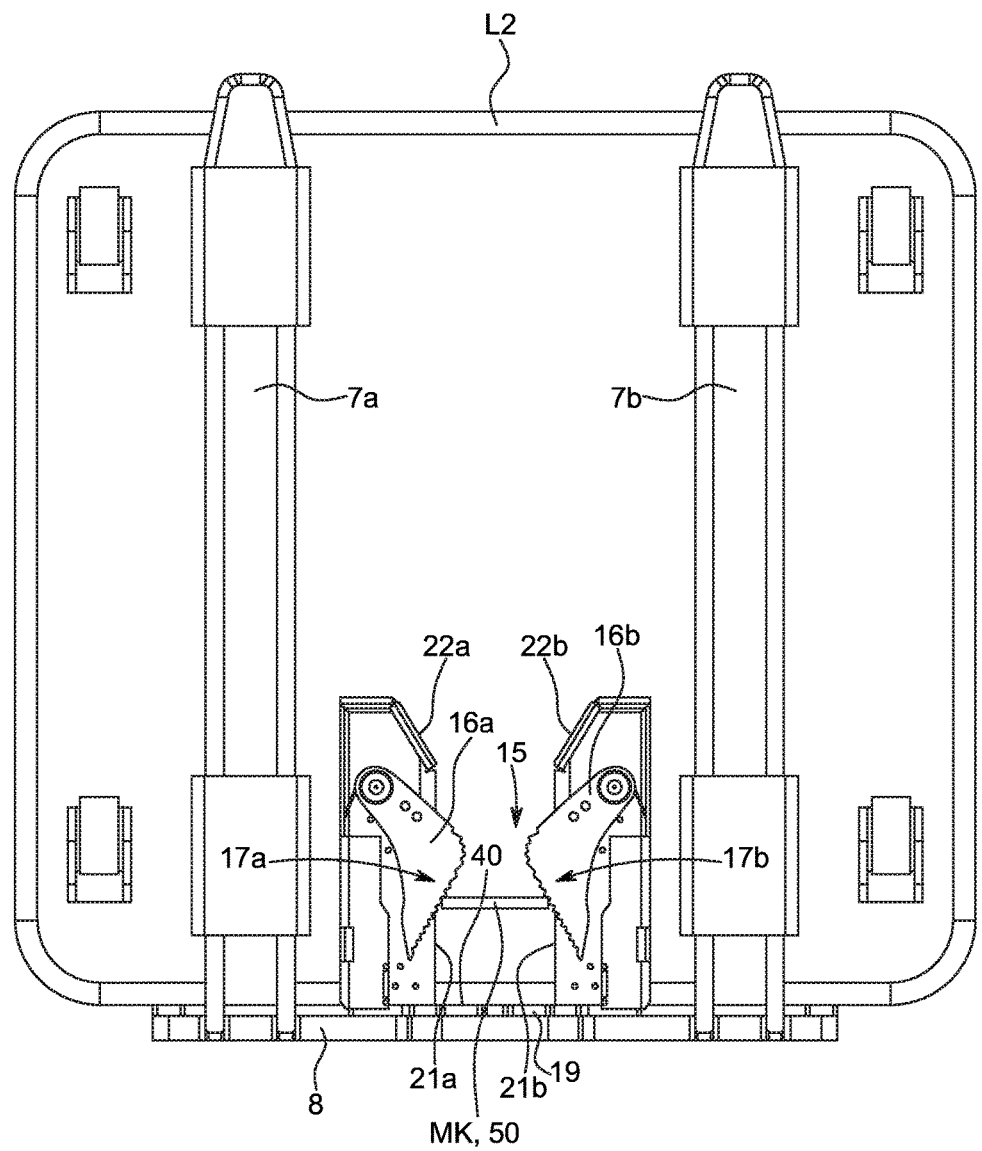
FIG. 8 is the same as FIG. 7 with an illustration of the load carrier interlocking device in the interlocked position that secures the picked up load carrier.
Figure 9:
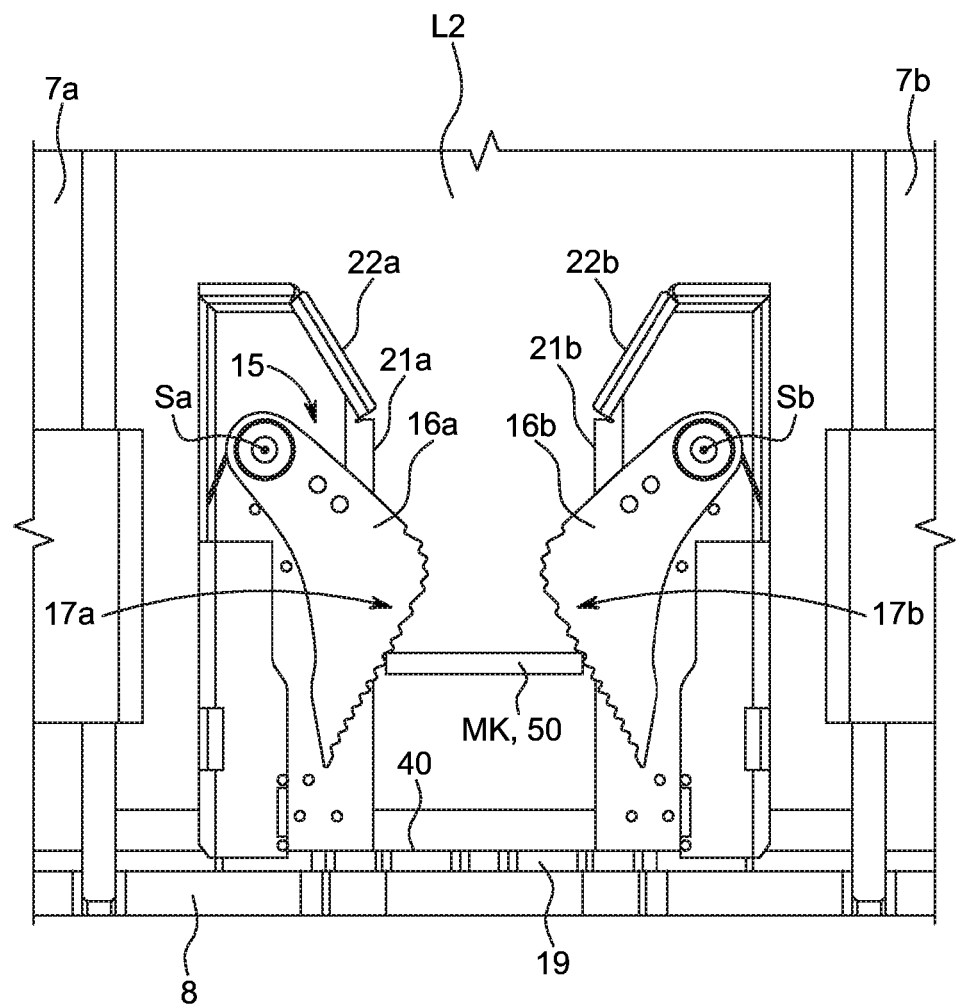
FIG. 9 is an enlarged detail of FIG. 8.

FIGS. 7 to 9 illustrate the first exemplary embodiment of the load carrier interlocking device 15 in connection with a load carrier L2 in the form of an order picking trolley. The center block MK of the load carrier L2, with which the cheeks 16a, 16b are in an operative connection and contact in the interlocked position illustrated in FIGS. 8 and 9, is formed by a plate 50, such as a metal plate, the position and size of which correspond to the rear end surface of the center block MK of the load carrier L1.

Figure 10A:
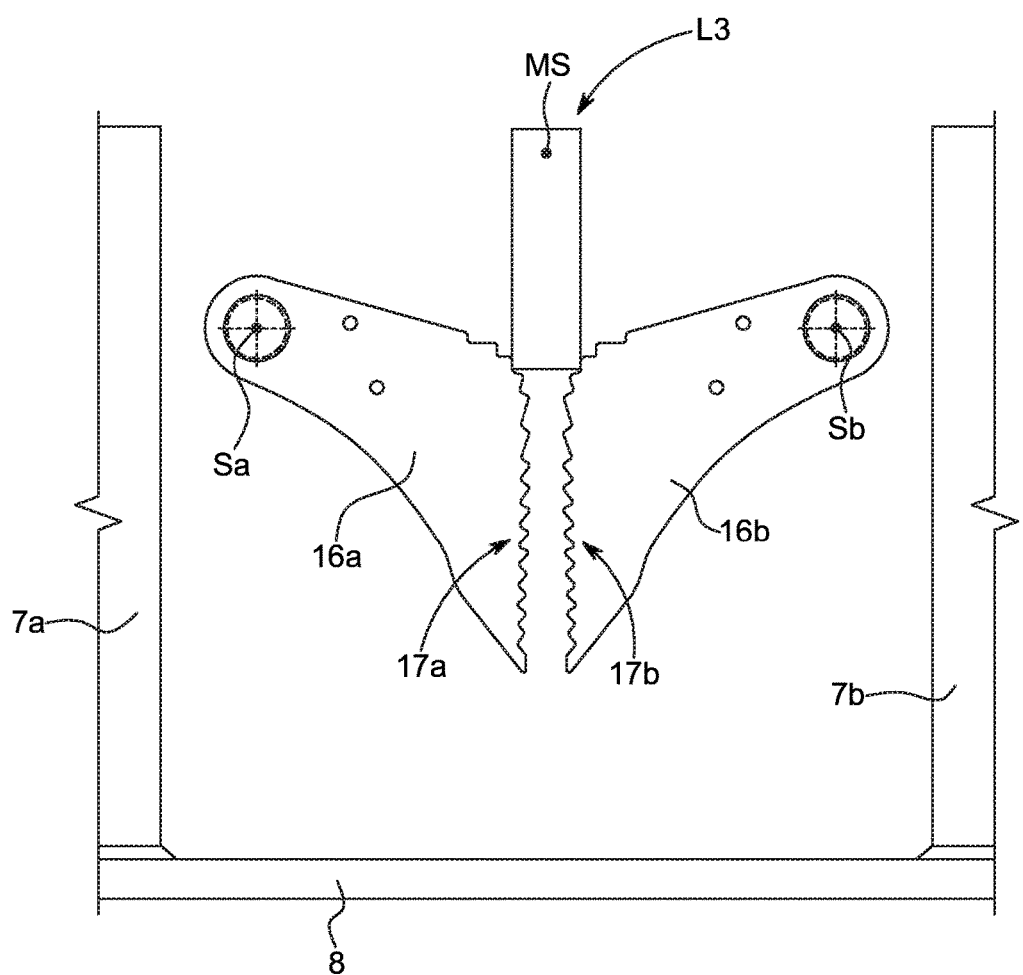
FIG. 10a shows the load carrier interlocking device illustrated in FIGS. 2 to 4 during insertion into a third embodiment of a load carrier, wherein the load carrier interlocking device is in the pick up position.
Figure 10B:
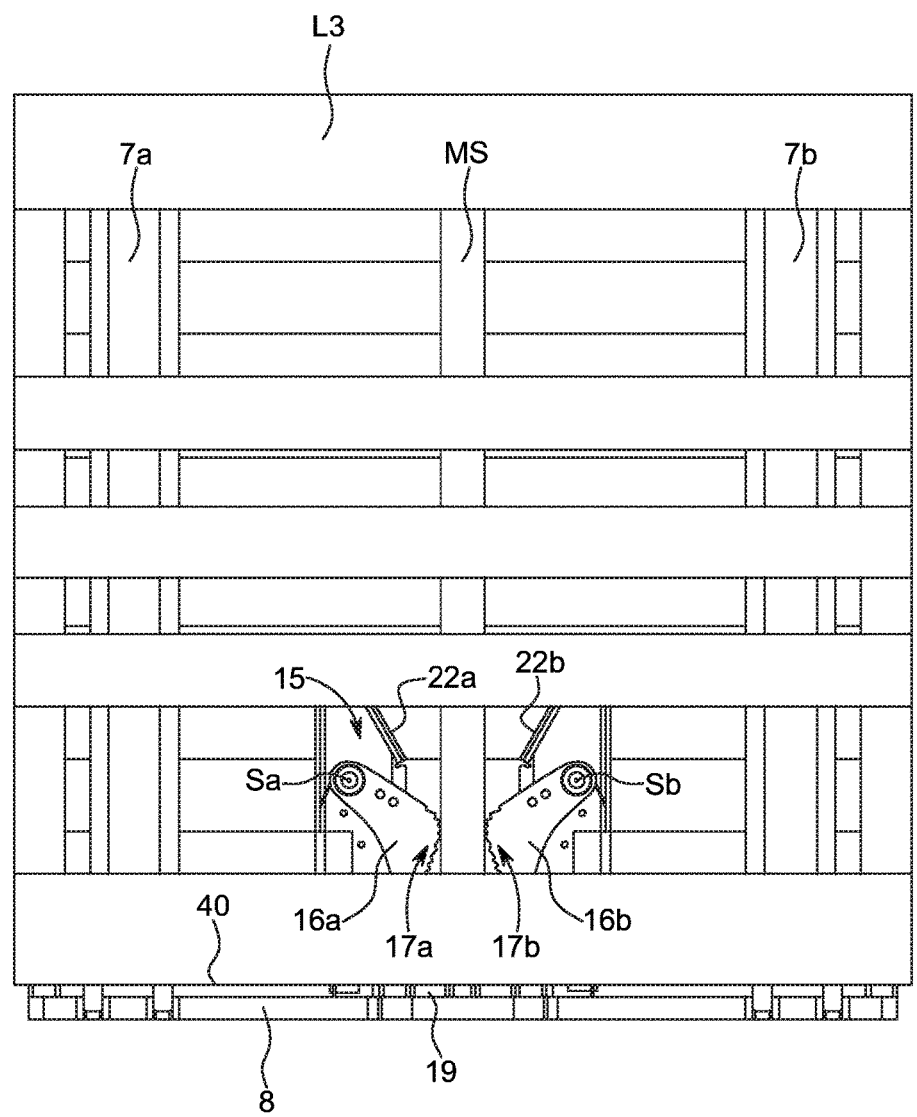
FIG. 10b shows the load carrier interlocking device illustrated in FIGS. 2 to 4 after the load carrier has been picked up, wherein the load carrier interlocking device is in an interlocked position.

FIGS. 10a and 10b illustrate the first embodiment of the load carrier interlocking device 15 in connection with a load carrier L3 that comprises a continuous center web MS with which the cheeks 16a, 16b interact to secure the picked up load carrier L3. FIGS. 10a and 10b each show a view from below.

The load carrier L3, as illustrated in greater detail in FIG. 10b, is constructed by way of example of a US pallet or an Australian pallet.

To pick up the load carrier L3, the industrial truck 1 is driven toward the load carrier L3 and the fork tines 7a, 7b are inserted into the pick up channels of the load carrier L3. The continuous center web MS enters the load carrier interlocking device 15. The cheeks 16a, 16b are then in the pick up position that forms the starting position of the cheeks 16a, 16b. As the fork tines 7a, 7b are inserted into the load carrier L3, the cheeks 16a, 16b, which are then in the pick up position, come into contact against the forward end surface of the center web MS so that the center web MS is in contact against the cheeks 16a, 16b. This situation is illustrated in FIG. 10a.

As the industrial truck 1 is driven farther into the load carrier L3, the cheeks 16a, 16b, which are in the pick up position, are pivoted outwardly away from each other by the load carrier L1 being picked up by means of the center web MS against the force of the spring device 30 and pivot outward, whereby the cheeks 16a, 16b are held in contact with the center web MS by the spring force of the spring device 30. As soon as the load carrier L3 has reached the stop surface 40 of the load handling device and is in contact with it, the cheeks 16a, 16b are pressed by the spring force of the spring device 30 against the center web MS and are actuated inwardly by the spring force of the spring device 30 into an interlocked position in which the teeth of the toothed segments 17a, 17b press into the center web MS to hold the center web MS, and thus the load carrier L3, positively. The securing position is illustrated in FIG. 10b.

An automatic self-locking of the cheeks 16a, 16b is achieved in the interlocked position. As a result of the automatic self-locking principle, the normal force of the teeth of the toothed segments 17a, 17b of the selected contour of the movement of the load carrier L3 in the longitudinal direction of the load handling device 6 is reinforced and the teeth press into the center web MS and create a positive connection.

A movement of the load carrier L3 in the transverse direction of the load handling device 6 is limited and minimized by the guide surfaces 21a, 21b of the entry pocket 20 and by the contour of the cheeks 16a, 16b.

For withdrawal from the load carrier L3, analogous to FIG. 5d, the actuator device 35 is actuated for the duration of the withdrawal of the fork tines 7a, 7b from the load carrier L3 to pivot the cheeks 16a, 16b outwardly into the release position.

The load carrier interlocking device 15 has a series of advantages.

With the load carrier interlocking device 15, different types of load carriers L1, L2, L3 that have a center web MS or a center block MK can be held in position positively and safely. A pallet can have a center block MK made of wood. As a result of the positive encompassing of the center block MK, the center block MK can also be in the form of metal plate, such as a wire mesh box or an order picking trolley.

The load carrier interlocking device 15 does not require an active actuation of the cheeks 16a, 16b when picking up a load carrier L1-L3, because the cheeks 16a, 16b actuated by the spring force device 30 when inserted into a load carrier L1-L3, they are automatically actuated by the center block MK or the center web MS and automatically secure the fully picked up load carrier L1-L3, which is also in contact with the stop surface 40 when it is picked up. No drive system with electrical, hydraulic or pneumatic components for active actuation of the cheeks 16a, 16b is required to pick up a load carrier L1-L3, on account of the passive actuation of the cheeks 16a, 16b. The load carrier interlocking device 15 is simpler, easier and more economical to construct and the load carrier L1-L3 is secured even when the industrial truck 1 is turned off or in the event of a power failure.

The actuator device 35 needs to be actuated only to set down the load carrier L1-L3, and then only for the duration of the withdrawal from the center block MK or from the center web MS of the load carrier L1-L3. The radii on the teeth Z1-Zn make possible a secure opening of the cheeks 16a, 16b with low actuation forces. The actuator device 35 can be easily implemented purely mechanically with a manual actuation, which further reduces the cost and effort of construction. As a result of the manual actuation, the load carrier can be unsecured even if the industrial truck 1 is shut off or in the event of a power failure.

When a load carrier L1, L2 is secured with a center block MK, damage or wear to the center block MK is also prevented, because on the load carrier interlocking device 15 the teeth of the toothed segments on the cheeks 16a, 16b do not press into the lateral surfaces of the center block MK.

With the load carrier interlocking device 15, a load carrier L1-L3 in contact against the stop surface 40 is also securely held in place if it is not inserted exactly centrally with the center block MK or the center web MS. In this case, the two cheeks 16a, 16b pivot by different pivoting angles.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. An industrial truck with a load handling device for picking up a load carrier, comprising:
   a load handling device formed by a load fork comprising two fork tines; and
   a load carrier interlocking device for interlocking a load carrier picked up with the load fork,
   wherein the load carrier interlocking device comprises two pivotable cheeks, each of which is pivotably mounted around a pivoting axis, wherein the cheeks each include a toothed segment on end surfaces facing each other and the toothed segments in an interlocked position of the cheeks positively secure a load carrier, wherein the cheeks are biased by a spring device toward a pick up position and an interlocking position, wherein the two cheeks, in the pick up position and the interlocking position, are pivotable inwardly toward each other, and the cheeks are constructed so that when the industrial truck enters a load carrier with the load fork during pick up of the load carrier, the cheeks in the pick up position are pivoted outwardly away from each other against the force of the spring device by the load carrier being picked up such that the load carrier opens the cheeks to allow the cheeks to receive the load carrier, and when the load carrier is completely picked up, the cheeks are actuated by the spring device toward the interlocking position in which the load carrier is secured positively in position by the toothed segments, wherein the load carrier interlocking device defines an entry pocket for a center web or a center block of a load carrier, wherein the entry pocket is formed by a guide component attached to each cheek, each guide component comprising a guide surface oriented parallel to the fork tines and an entry bevel that runs at an angle to the guide surface, wherein each guide component associated with each cheek is adjustable relative to the pivoting axis of the associated cheek such that each guide component is movable towards and away from the opposing guide component to adjust a width of the entry pocket.

2. The industrial truck as recited in claim 1, wherein the two cheeks interact with a center web of the load carrier, such that in the interlocked position the two cheeks are engaged positively with the toothed segments in the center web of the load carrier.

3. The industrial truck as recited in claim 2, wherein in the interlocked position, there is an automatic self locking of the cheeks that amplifies a force of the cheeks.

4. The industrial truck as recited in claim 1, wherein the two cheeks interact with a center block of the load carrier, wherein when the load carrier is fully picked up, in the interlocked position the two cheeks with the toothed segments are positively engaged with the center block of the load carrier to prevent movement of the load carrier out of the load carrier interlocking device.

5. The industrial truck as recited in claim 1, wherein the teeth of the toothed segments are each provided on at least one tooth flank with radial surfaces that have a center point in the pivoting axis of the associated cheek.

6. The industrial truck as recited in claim 1, wherein the toothed segment is located on an arcuate contour segment of the cheeks.

7. The industrial truck as recited in claim 1, wherein the toothed segment is located on a straight-line contour segment of the cheek.

8. The industrial truck as recited in claim 1, wherein to pivot the cheeks into a release position to release the load carrier, the carrier interlocking device includes an actuator device, wherein the cheeks are pivotable outwardly against the force of the spring device by actuation of the actuator device.

9. The industrial truck as recited in claim 8, wherein the actuator device includes a manually actuatable control element, which is in an operative connection with each cheek by an actuation means.

10. The industrial truck as recited in claim 1, wherein the pivoting axis around which each cheek is pivotable is a vertical axis on the industrial truck, wherein the pivoting axes are oriented at a distance from each other in the transverse direction of the truck.

11. The industrial truck as recited in claim 1, wherein the pivoting axes of the cheeks are each located in the longitudinal direction of the load handling device between a stop surface of the load handling device, with which the fully lifted load carrier is in contact, and a fork tip of the fork tines.

12. The industrial truck as recited in claim 1, wherein the cheeks are each mounted on respective retaining components so that they are rotatable around the pivoting axis, wherein the retaining components are located adjacent to insides of the fork tines and extend from fork carrier backs toward fork tips of the fork tines.

13. The industrial truck as recited in claim 1, wherein the guide components are fastened to a retaining component on which each cheek is mounted.

14. The industrial truck as recited in claim 13, wherein the guide components are selectively fastenable to a corresponding retaining component in different attachment positions, wherein the guide components in the different attachment positions have a different distance of the guide surfaces that face each other.

15. The industrial truck as recited in claim 1, wherein the cheeks comprise at least two individual cheeks that are at a distance from each other in a vertical direction and are coupled with each other.

16. The industrial truck as recited in claim 1, wherein the spring device comprises leg springs, each of which is associated with a cheek.

17. The industrial truck as recited in claim 16, wherein the leg spring is oriented concentric to the pivoting axis of the associated cheek and is supported with a first leg on the cheek and with a second leg on a retaining component on which the cheek is mounted.

18. The industrial truck as recited in claim 1, wherein the load handling device includes a sensor device to detect a fully lifted load carrier on the load fork.

* * * * *